United States Patent
Simmons et al.

(10) Patent No.: US 7,653,504 B1
(45) Date of Patent: Jan. 26, 2010

(54) METHOD AND APPARATUS FOR PROVIDING SHORTED PIN INFORMATION FOR INTEGRATED CIRCUIT TESTING

(75) Inventors: Tuyet Ngoc Simmons, Monte Sereno, CA (US); Michael L. Simmons, Monte Sereno, CA (US)

(73) Assignee: Xilinx, Inc., San Jose, CA (US)

( * ) Notice: Subject to any disclaimer, the term of this patent is extended or adjusted under 35 U.S.C. 154(b) by 163 days.

(21) Appl. No.: 11/651,904

(22) Filed: Jan. 9, 2007

(51) Int. Cl.
*G06F 3/00* (2006.01)

(52) U.S. Cl. .................. 702/118; 702/120; 702/122; 702/183

(58) Field of Classification Search ............... 702/108, 702/118, 120, 122, 125, 182; 340/3.51; 361/767; 710/317; 714/727, 56
See application file for complete search history.

(56) References Cited

U.S. PATENT DOCUMENTS

| | | | | |
|---|---|---|---|---|
| 4,825,438 A | * | 4/1989 | Bennett et al. | 714/56 |
| 5,939,999 A | * | 8/1999 | Ohgaki | 340/3.51 |
| 6,754,763 B2 | * | 6/2004 | Lin | 710/317 |
| 6,801,869 B2 | * | 10/2004 | McCord | 702/117 |
| 6,988,229 B1 | * | 1/2006 | Folea, Jr. | 714/727 |

OTHER PUBLICATIONS

Xilinx, Inc., "Virtex-4 Packaging and Pinout Specification", Sep. 30, 2005, pp. 1-17, v2.4, UG075, available from Xilinx, Inc., 2100 Logic Drive, San Jose, CA 95124.

* cited by examiner

*Primary Examiner*—Eliseo Ramos Feliciano
*Assistant Examiner*—Felix E Suarez
(74) *Attorney, Agent, or Firm*—Robert M. Brush

(57) ABSTRACT

Method and apparatus for providing shorted pin information for constructing a device under test (DUT) board for integrated circuit testing is described. In one example, an interface to an application module that implements pin-shorting rules associated generally with a plurality of integrated circuits and stores package files associated with specific ones of the integrated circuits is provided. A device and a package defining one of the plurality of integrated circuits are selected via the interface. At least one query is executed against the pin-shorting rules and the package files stored in the database via the interface. A shorted pin plan for the device and the package as selected is generated based on information obtained in response to the at least one query.

20 Claims, 9 Drawing Sheets

Bank # and Pin count for 5VLX50T, FF1136

| Left | Center | Right | Right Edger |
|---|---|---|---|
| Bank #: 11 Pin Count: 40 | Bank #: 0 Pin Count: 23 | Bank #: 12 Pin Count: 40 | Bank #: -1 Pin Count: 1 |
| Bank #: 13 Pin Count: 40 | Bank #: 1 Pin Count: 20 | Bank #: 18 Pin Count: 40 | Bank #: 112 Pin Count: 11 |
| Bank #: 15 Pin Count: 40 | Bank #: 2 Pin Count: 20 | Bank #: 20 Pin Count: 40 | Bank #: 114 Pin Count: 10 |
| Bank #: 17 Pin Count: 40 | Bank #: 3 Pin Count: 20 | Bank #: 22 Pin Count: 40 | Bank #: 116 Pin Count: 10 |
| Bank #: 19 Pin Count: 40 | Bank #: 4 Pin Count: 20 | | Bank #: 118 Pin Count: 10 |
| Bank #: 21 Pin Count: 40 | | | Bank #: 120 Pin Count: 10 |
| | | | Bank #: 122 Pin Count: 10 |

FIG. 8

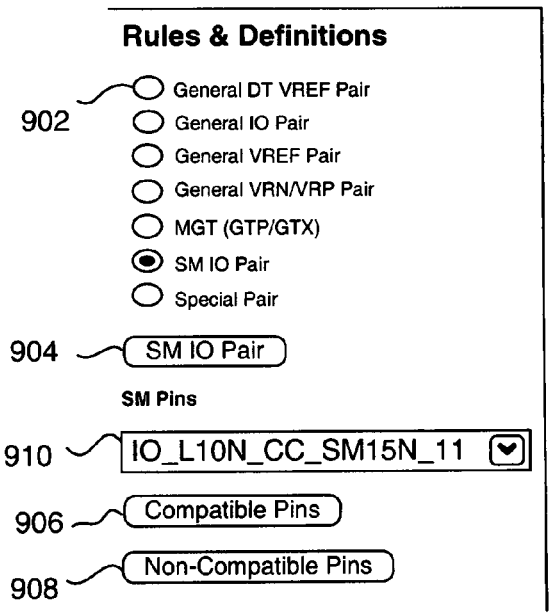

FIG. 9

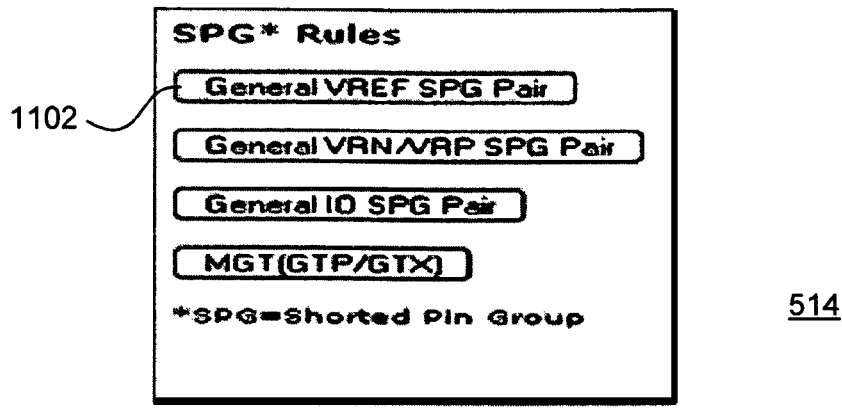
FIG. 11
General VREF Pair SPG Pair Rules
- A general VREF SPG Pair consists of:
  - Many General VREF Pairs
  - May be one Special VREF Pair
  - One General DT VREF Pair
1202
1200
FIG. 12
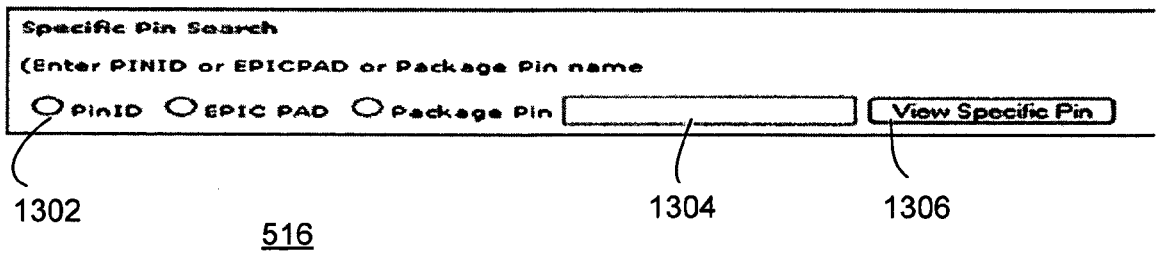
FIG. 13

METHOD AND APPARATUS FOR PROVIDING SHORTED PIN INFORMATION FOR INTEGRATED CIRCUIT TESTING

FIELD OF THE INVENTION

One or more aspects of the present invention relate generally to a method and apparatus for providing, shorted pin information for constructing a device under test (DUT) board for integrated circuit testing.

BACKGROUND OF THE INVENTION

Testing integrated circuit (IC) functionality is critical throughout the entire lifetime of the product from development through high volume manufacturing. A device under test (DUT) board is an important element of the test hardware requirement to test ICs. As used herein, the term "integrated circuit" is meant to encompass both the IC device (i.e., semiconductor die) and its package (e.g., a packaged IC). The DUT board serves as the interconnection between a test socket for receiving the IC and automatic test equipment (ATE) for applying test vectors during testing the IC. Since the DUT board is at the center of the test system, designing and producing a DUT board requires knowledge of the IC to be tested and the ATE used in the test system, in particular, the number of tester channels of the ATE. A "tester channel" is a signal path between the DUT and the ATE.

One example of an IC is a programmable logic device (PLD), such as a field programmable gate array (FPGA) or a complex programmable logic device (CPLD). Present state of the art FPGAs, for example, include more than 1000 input/output (I/O) pins. Use of ATE that supplies a corresponding number of tester channels is costly and generally not economically feasible. To overcome this problem, DUT boards may be designed where several groups of I/O pins are shorted together such that there is one group of shorted I/O pins per tester channel of the ATE. Without the shorted pin approach, each I/O would require its own tester channel.

The developer of the test methodology for a given IC determines the best manner in which to short the I/O pins together. The developer must accurately communicate shorted-pin information for the IC to the manufacturer of the DUT board. Typically, the DUT manufacturer receives shorted-pin information via informal guidelines or non-documented word-of-mouth instructions. If incorrect information is passed to the DUT board manufacturer, the DUT board will not be constructed properly, leading to costly re-working of the DUT board or complete re-building of the DUT board. Such re-working or re-building of the DUT board further leads to delays in introducing new products to the market and extra expense. Moreover, some IC devices have many specialized I/Os, such as Joint Action Test Group (JTAG) I/Os. These specialized I/Os often exhibit limitations in that some special I/Os cannot be shorted with other special I/Os, which further complicates the information needed to manufacture a DUT board.

Accordingly, there exists a need in the art for systematically storing and providing shorted pin information for constructing a DUT board for a packaged integrated circuit.

SUMMARY OF THE INVENTION

Method and apparatus for providing shorted pin information for constructing a device under test (DUT) board for an integrated circuit is described. In one embodiment, an interface to an application module that implements pin-shorting rules associated generally with a plurality of integrated circuits and stores package files associated with specific ones of the integrated circuits is provided. A device and a package defining one of the plurality of integrated circuits are selected via the interface. At least one query is executed against the pin-shorting rules and the package files stored in the database via the interface. A shorted pin plan for the device and the package as selected is generated based on information obtained in response to the at least one query. Many other queries are possible, including validation of an existing shorted pin plan, general information about pins, specific information about which pins are compatible with which other pins, and the like.

BRIEF DESCRIPTION OF THE DRAWINGS

Accompanying drawings show exemplary embodiments in accordance with one or more aspects of the invention; however, the accompanying drawings should not be taken to limit the invention to the embodiments shown, but are for explanation and understanding only.

FIG. 8 shows an exemplary embodiment of a report in accordance with one or more aspects of the invention;

FIG. 9 shows an exemplary embodiment of a rules/definition section of the web interface of FIG. 5;

FIG. 11 shows an exemplary embodiment of a SPG rule section of the web interface of FIG. 5;

FIG. 12 shows an exemplary embodiment of a report for general VREF SPG pair rules;

FIG. 13 is an exemplary embodiment of a pin search section of the web interface of FIG. 5;

DETAILED DESCRIPTION OF THE DRAWINGS

Method and apparatus for providing shorted pin information for constructing a device under test (DUT) board for an integrated circuit (IC) testing is described. One or more aspects of the invention are described with respect to a field programmable gate array (FPGA) IC for purposes of clarity by example. Those skilled in the art will appreciate that the invention may be employed with any type of IC.

Figure 1:
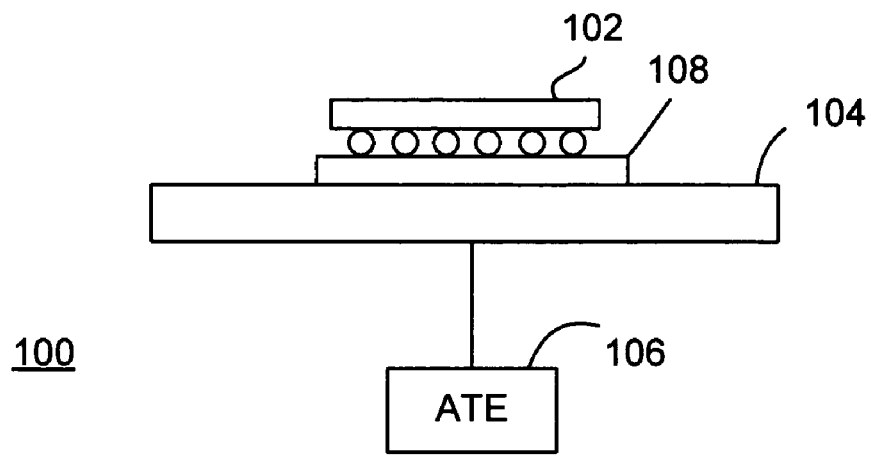
FIG. 1 is a block diagram depicting a simplified example of an integrated circuit (IC) test system.

FIG. 1 is a block diagram depicting a simplified example of an IC test system 100. The test system 100 includes an IC 102, a DUT board 104, and automatic test equipment (ATE) 106. The IC 102 includes a semiconductor die within a package (e.g., a ball grid array (BGA) package). The IC 102 includes an array of pins formed on a surface of the package (shown in FIG. 2). The term "pins" is meant to encompass any type of contact on the package that is electrically coupled to the semiconductor die (e.g., solder balls). The IC 102 is mounted to a test socket 108 that interfaces with the DUT board 104. The test socket 108 includes contacts (not shown) for electrically coupling the pins to the DUT board 104. The DUT board 104 comprises a printed circuit board (PCB) or the like having various patterned metal layers (not shown) for electrically coupling the contacts of the test socket 108 to the ATE 106. The ATE 106 is configured with a plurality of tester channels. The ATE 106 transmits test signals to the IC 102 via one or more of the tester channels, and receives output signals from the IC 102 via one or more of the tester channels. Various well known details of a practical IC test system have been omitted for clarity.

Figure 2:
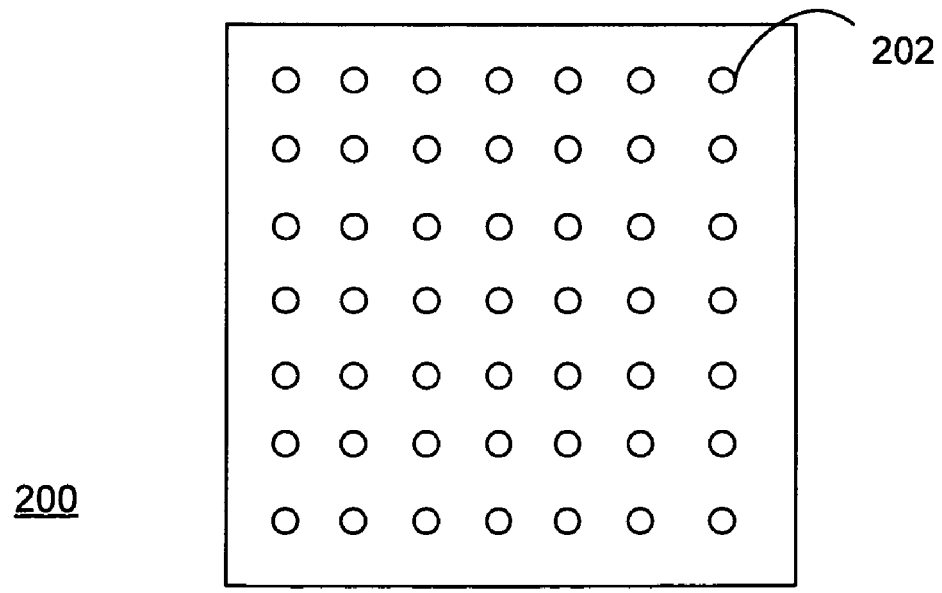
FIG. 2 is a plan view showing pins of an exemplary IC.

FIG. 2 is a plan view showing pins 202 of an exemplary IC 200. In the present example, the pins 202 are configured in a generally rectangular array on a major surface of the package of the IC 200. Each of the pins 202 is of a certain type for performing a certain function. Pin types may be organized into various hierarchies, but generally include I/O pins, power/ground pins, and other miscellaneous pins. The I/O pins are typically organized into banks. Each of the I/O banks may include specialized I/O pins. For example, an FPGA may include I/O bank(s) having input threshold voltage pins (VREF), digitally controlled impedance (DCI) voltage reference resistor pins (VRN/VRP), system monitor (SM) pins, multi-gigabit transceiver (MGT) pins, and the like. Exemplary specialized I/O pins, including the aforementioned specialized I/O pins, are described in the Virtex-4 Packaging and Pinout Specification, version 2.4, 30 Sep. 2005, pp. 1-17, which is incorporated by reference herein. The power/ground pins include pins for various voltages (e.g., core, I/O, etc.) and pins for ground. Miscellaneous pins include JTAG pins (e.g., TDI, TDO, etc.), FPGA configuration pins, and the like. The particular pattern of pin types in the pins 202 is referred to as the package pinout or pinout pattern.

Figure 3:
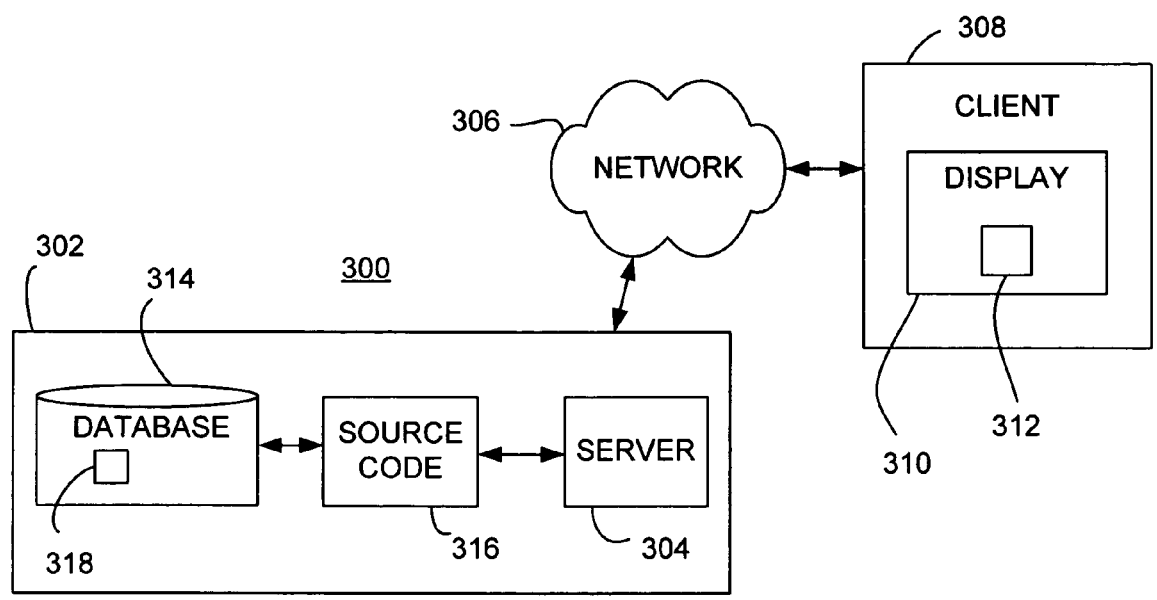
FIG. 3 is a block diagram depicting an exemplary embodiment of a system for providing shorted pin information for constructing a device under test (DUT) board in accordance with one or more aspects of the invention.

FIG. 3 is a block diagram depicting an exemplary embodiment of a system 300 for providing shorted pin information for constructing a device under test (DUT) board in accordance with one or more aspects of the invention. The system 300 includes an application module 302, a network 306, and a client device 308. The client device 308 is configured for communication with the network 306. The client device 308 communicates with the application module 302 through the network 306. For purposes of clarity by example, a single client device is shown. It is to be understood that the application module 302 may communication with multiple client devices through the network 306.

The application module 302 includes a database 314, source code 316, and a server 304. The database 314 is configured to store package files information in database tables 318. Data is extracted from package files and loaded into the database tables 318. The source code 316 implements various pin-shorting rules. Pin-shorting rules are general and not limited to specific devices and packages defining ICs, but are limited to specific families of ICs. In one embodiment, the source code 316 includes sets of pin shorting rules respectively corresponding to sets or families of ICs. For example, one set of pin-shorting rules may be associated with Virtex-4 FPGAs, and another set of pin-shorting rules may be associated with Virtex-5 FPGAs. The Virtex-4 and Virtex-5 families of FPGAs are commercially available from Xilinx, Inc. of San Jose, Calif. Pin-shorting rules define which pins or pin types can be shorted to which other pins or pin types for a given family of ICs. For example, one pin shorting rule may be "SM IO can be shorted to General IO." Another exemplary pin-shorting rule may be "SM IO cannot be shorted to General VREF."

The database tables 318 include device/package information relating specifically to a particular IC. The database tables 318 represent information extracted from the package files, including information indicative of a package pinout for a particular IC. For example, a package file may include a bank number, pin description, and pin number for each pin on a given IC. A "pin description" includes codes indicating the type and/or function of a pin. An exemplary template for a pin description of a Virtex-5 device is IO_LXXY_ZZZ_#, where IO indicates an I/O pin; # represents a bank number; LXXY indicates a differential pair, with XX a-unique pair in the bank and Y is P or N for positive or negative sides of the differential pair; and ZZZ represents a specific specialized function (e.g., VREF, VRN, VRP, SM, MGT, etc.). Those skilled in the art will appreciate that other types of pin descriptions may be extracted from the package files and loaded into the database tables 318.

The server 304 provides an interface to the source code 316 and the database 314 for the client device 308. In one embodiment, the server 304 comprises a web server. The client device 308 includes a display 310. The client device 308 communicates with the server 304 through the network 306 using a web-based protocol (e.g., hypertext transfer protocol (HTTP)). The server 304 provides a web interface, which is shown to a user of the client device 308 via a graphical user interface (GUI) 312 on the display 310. As discussed below, the web interface of the server 304 provides a variety of reports and documentation based on the information stored in the database 314 and pin-shorting rules implemented by the source code 316 that allow a user of the client device 308 to generate or facilitate generation of a shorted pin plan. The shorted pin plan may be used to determine which pins of an IC under test are to be shorted together, thereby enabling the manufacture of a DUT board.

The database 314, the source code 316, and the server 304 are logical components having a variety of physical implementations. For example, the database 314 may be implemented using one or more computers or servers (e.g., an ORACLE database). The server 304 may be implemented using one or more computers. Alternatively, the database 314 and the server 304 may be implemented using a single computer. The source code 316 may be implemented using hardware, firmware, software, and the like, or some combination thereof. For example, the source code 316 may be implemented using a variety of computer programming languages, including PHP, C/C++, Java, PL/SQL, among other programming languages known in the art.

Figure 4:
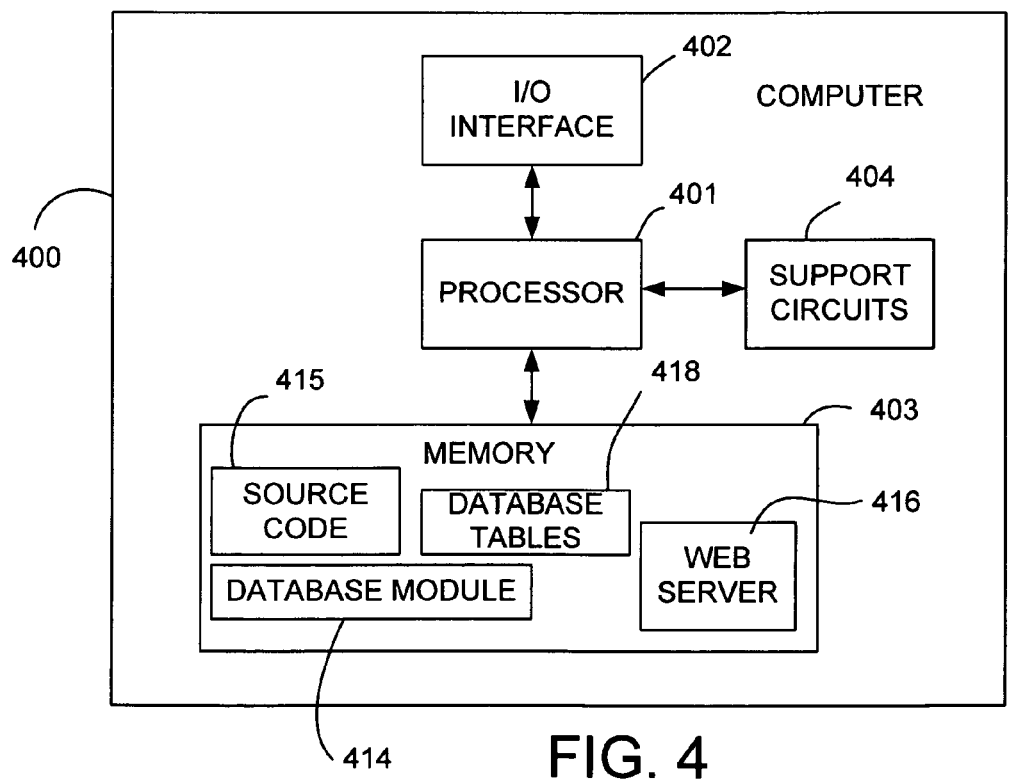
FIG. 4 is a block diagram depicting an exemplary embodiment a computer suitable for implementing a database and a web server in accordance with one or more aspects of the invention.

FIG. 4 is a block diagram depicting an exemplary embodiment a computer 400 suitable for implementing the application module 302 in accordance with one or more aspects of the invention. The computer 400 includes a processor 401, a memory 403, various support circuits 404, and an I/O interface 402. The processor 401 may include one or more microprocessors known in the art. The support circuits 404 for the processor 401 include conventional cache, power supplies, clock circuits, data registers, I/O interfaces, and the like. The I/O interface 402 may be directly coupled to the memory 403 or coupled through the processor 401. The I/O interface 402 is coupled to the network 306 for communication with client devices.

The memory 403 stores processor-executable instructions and/or data that may be executed by and/or used by the processor 401. These processor-executable instructions may comprise hardware, firmware, software, and the like, or some combination thereof. Modules having processor-executable instructions that are stored in the memory 403 include a database module 414, source code module 415, and a web server module 416. Data stored in the memory 403 includes database tables 418. The database module 414 is configured to interface the database tables 418. The database module 414 may be an SQL database or the like known in the art. The web server module 416 is configured to provide a web interface. For example, the web server module 416 may be an Apache web server or the like known in the art. The source code module 415 is configured to implement pin-shorting rules. The source code module 415 is also configured to handle queries to the database module 414.

The computer 400 may be programmed with an operating system, which may be OS/2, Java Virtual Machine, Linux, Solaris, Unix, Windows, Windows95, Windows98, Windows NT, Windows2000, WindowsME, WindowsXP, Windows Vista, and MacOS among other known platforms. At least a portion of an operating system may be disposed in the memory 403. The memory 403 may include one or more of the following: random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

Figure 5:
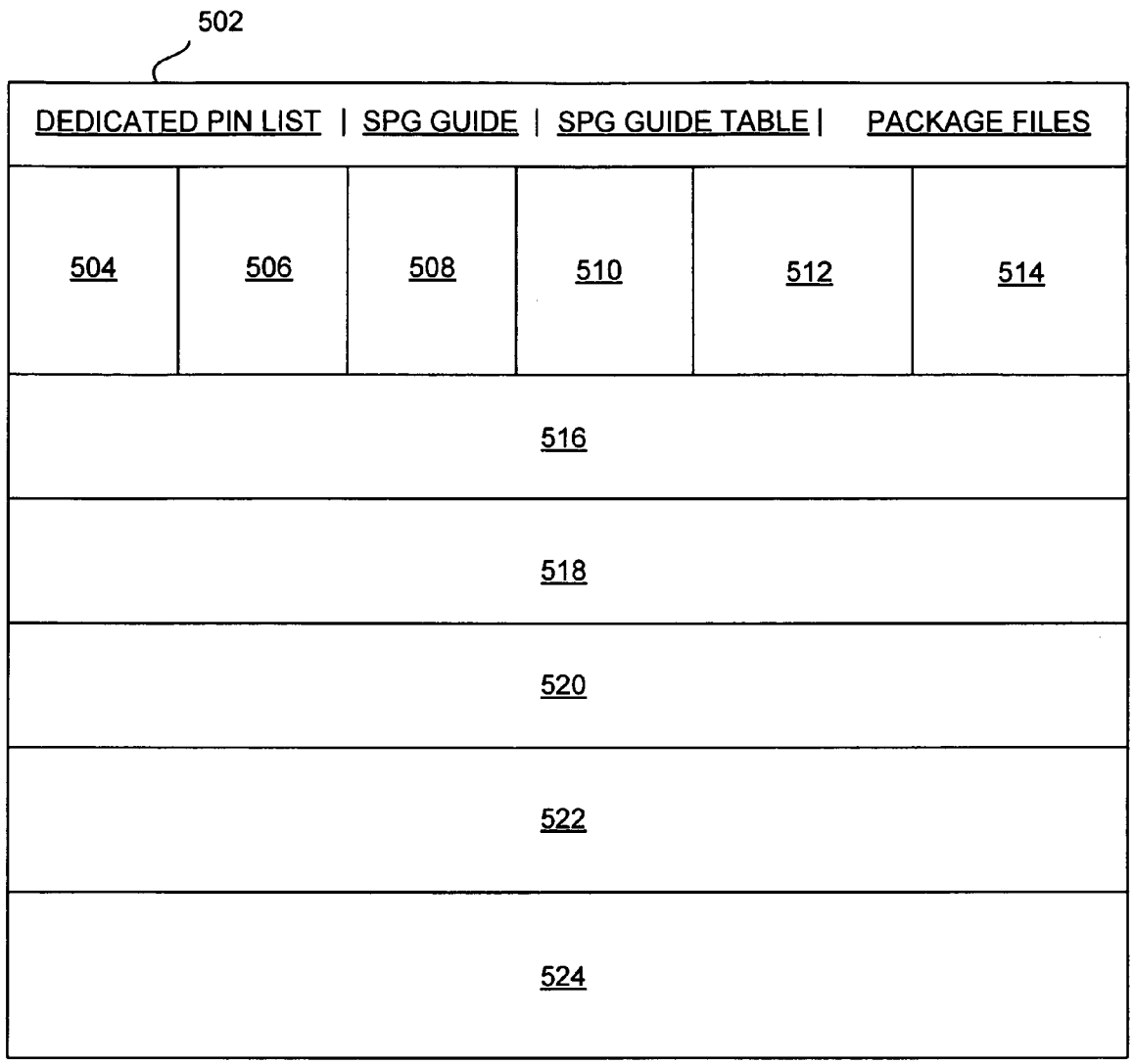
FIG. 5 is a block diagram depicting an exemplary web interface in accordance with one or more aspects of the invention.

FIG. 5 is a block diagram depicting an exemplary web interface 500 in accordance with one or more aspects of the invention. The web interface 500 may be implemented by the server 304 or the web server module 416, described above. The web interface 500 may be displayed on the GUI 312 described above. The web interface 500 includes a links section 502, a family section 504, a device section 506, a package section 508, a report section 510, a rules/definitions section 512, a shorted pin group (SPG) rule section 514, a pin search section 516, a shorted pair validation section 518, an IOs per channel section 520, a channel resource section 522, and a proposed shorted pin plan section 524. Each of the sections 502 through 524 comprises a pane or portion of the web interface 500. Each of the sections 502 through 524 include various controls, such as radio buttons, check boxes, list boxes, buttons, combo boxes, static text controls, and the like. The layout of the sections 502 through 524 is merely exemplary. Moreover, those skilled in the art will appreciate that other web interfaces may be used in accordance with aspects of the invention that include less sections or combinations of the sections listed above.

The links section 502 includes hyperlinks to various documents. For example, the links section 502 may include hyperlinks to a dedicated pin list, a shorted pin group guide, a shorted pin group guide table, and package files. The dedicated pin list documents which pins are dedicated. Those pins cannot be shorted to any other pins. The shorted pin group guide provides general information on pin shorting methodology, as well as documenting the shorting rules. The package files link allows one to access the actual package files.

Figure 6:
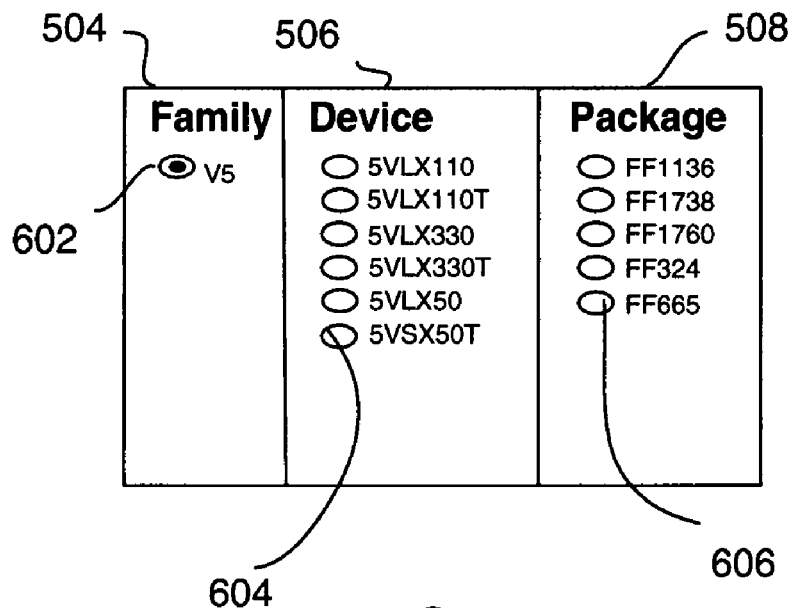
FIG. 6 shows an exemplary embodiment of a family section, a device section, and a package section of the web interface of FIG. 5.

FIG. 6 shows an exemplary embodiment of the family section 504, the device section 506, and the package section 508. The family section 504 includes one or more radio buttons 602 (e.g., one is shown). The radio buttons 602 are associated with a respective plurality of identifiers for IC families. In the present example, a Virtex-5 (V5) family is selectable. The Virtex-5 family of FPGAs is commercially available from Xilinx, Inc. of San Jose, Calif. The device section 506 includes a plurality of radio buttons 604 (e.g., 6 are shown). The radio buttons 604 are associated with a respective plurality of identifiers for semiconductor devices (i.e., IC die). In the present example, selectable devices include 5VLX110, 5VLX110T, 5VLX330, 5VLX330T, 5VLX50, and 5VSX50T. The package section 508 includes a plurality of radio buttons 606 (e.g., 5 are shown). The radio buttons 606 are associated with a respective plurality of identifiers for packages. In the present example, selectable packages include FF1136, FF1738, FF1760, FF324, and FF665. The identifiers for family, device, and package are merely exemplary. The source code adjusts the radio buttons presented through the user interface dynamically in response to the user's selections and also guarantees that the user can only choose valid Device/Package combinations.

Figure 7:
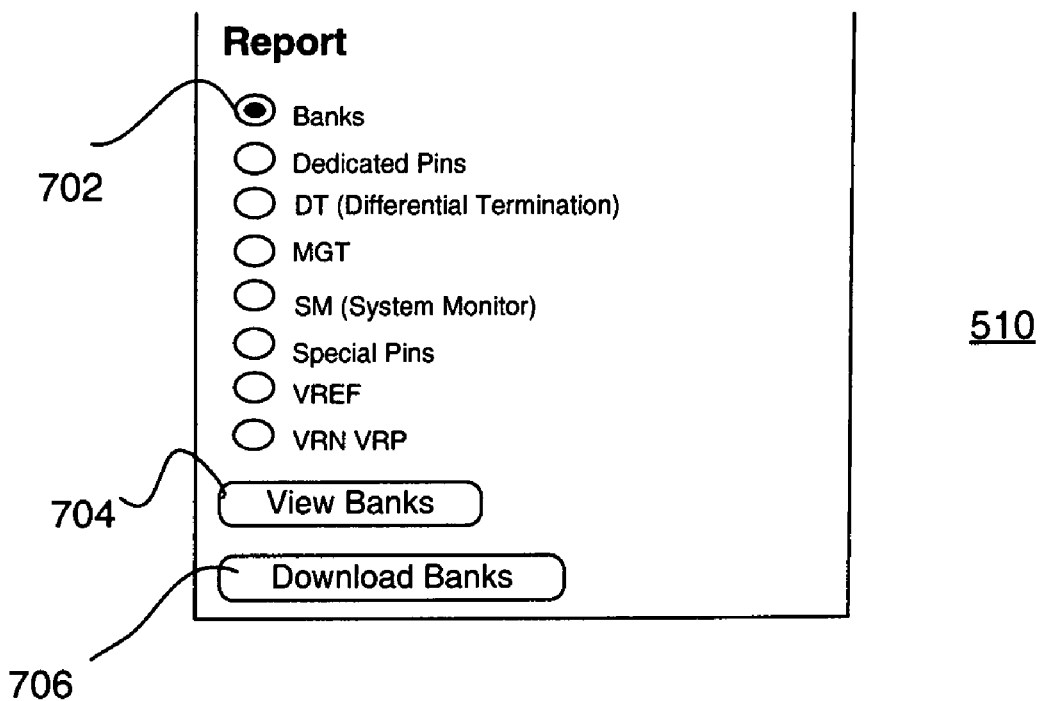
FIG. 7 shows an exemplary embodiment of a report section of the web interface of FIG. 5.

Returning to FIG. 5, the report section 510 is configured to provide pin functionality reports for the family, device, and package as selected. FIG. 7 shows an exemplary embodiment of the report section 510. The report section 510 includes a plurality of radio buttons 702 and buttons 704 and 706. The radio buttons 702 are associated with a respective plurality of report types. In the present example, selectable reports include banks report, dedicated pins report, differential termination (DT) report, multigigabit transceiver (MGT) report, system monitor (SM) report, special pins report, VREF report, and VRN/VRP report. Each report is based upon a user selected Device/Package combination. The banks report provides information as to how many pins each bank number contains. The dedicated pins report lists the dedicated pins and provides information about each one, including which bank to which they belong, a package pin name, and a location. The DT, MGT, Special Pins, VREF, and VRN/VRP reports list all the pins, along with the above information belonging to each of those categories. The button 704, when activated, shows a selected report on the display (e.g., a hypertext markup language (HTML) report). The button 706, when activated, downloads the selected report into a file (e.g., a csv file that can be imported into Microsoft Excel). The radio button for a banks report is shown as being selected.

A user may interact with the report section 510 to perform a query against the pin shorting rules and the package files stored in the database. The criteria of the query include the particular family/device/package selected and the type of report selected. Using the criteria, the web server calls the source code to query the database to obtain information for the report. FIG. 8 shows an exemplary embodiment of a report 800. The report 800 is generated by selecting banks from the radio buttons 702 and activating the button 704 to generate an HTML report. The report 800 includes a title 802 and columns 804 through 810. The title 802 indicates the report type and the family/device/package selected. The columns 804 through 810 correspond to different positions in the pin array for the selected IC (e.g., left, center, right, right edger, respectively). In each column, entries list the bank number and a pin count for that bank. The report 800 is merely exemplary and those skilled in the art will appreciate that other types of reports may be generated. Moreover, those skilled in the art will appreciate that similar reports may be generated for other report types selected in the report section 510.

Returning to FIG. 5, the rules/definition section 512 provides rules and definitions for different pin types. FIG. 9 shows an exemplary embodiment of the rules/definition section 512. The rules/definition section 512 includes a plurality of radio buttons 902, buttons 904, 906, and 908, and drop-down box 910. The radio buttons 902 are associated with a respective plurality of pin types. In the present example, selectable pin types include SM IO pair, general IO pair, general VREF pair, general VRN/VRP pair, special pair, general DT VREF pair, and MGT (GTP/GTX). The SM IO pair is shown as being selected. The drop-down box 910 includes a list of all SM pins corresponding to the selected family/device/package. The button 906, when activated, shows a list of compatible pins to the pin selected in the drop-down box 910 (i.e., pins that can be shorted to the selected pin). The button 908, when activated, shows a list of non-compatible pins to the pin selected in the drop-down box 910 (i.e., pins that cannot be shorted to the selected pin). The button 904, when activated, displays text in the browser that describes what an SM IO pin is, along with its shorting rules.

A user may interact with the rules/definitions section 512 to perform a query against the pin shorting rules and the package files stored in the database. The criteria of the query include the particular family/device/package selected, the type of pins selected, and the particular pin selected. Using the criteria, the web server calls the source code to query the database to obtain information for the report showing which pins are compatible and which pins are not compatible for the selected pin.

Figure 10:
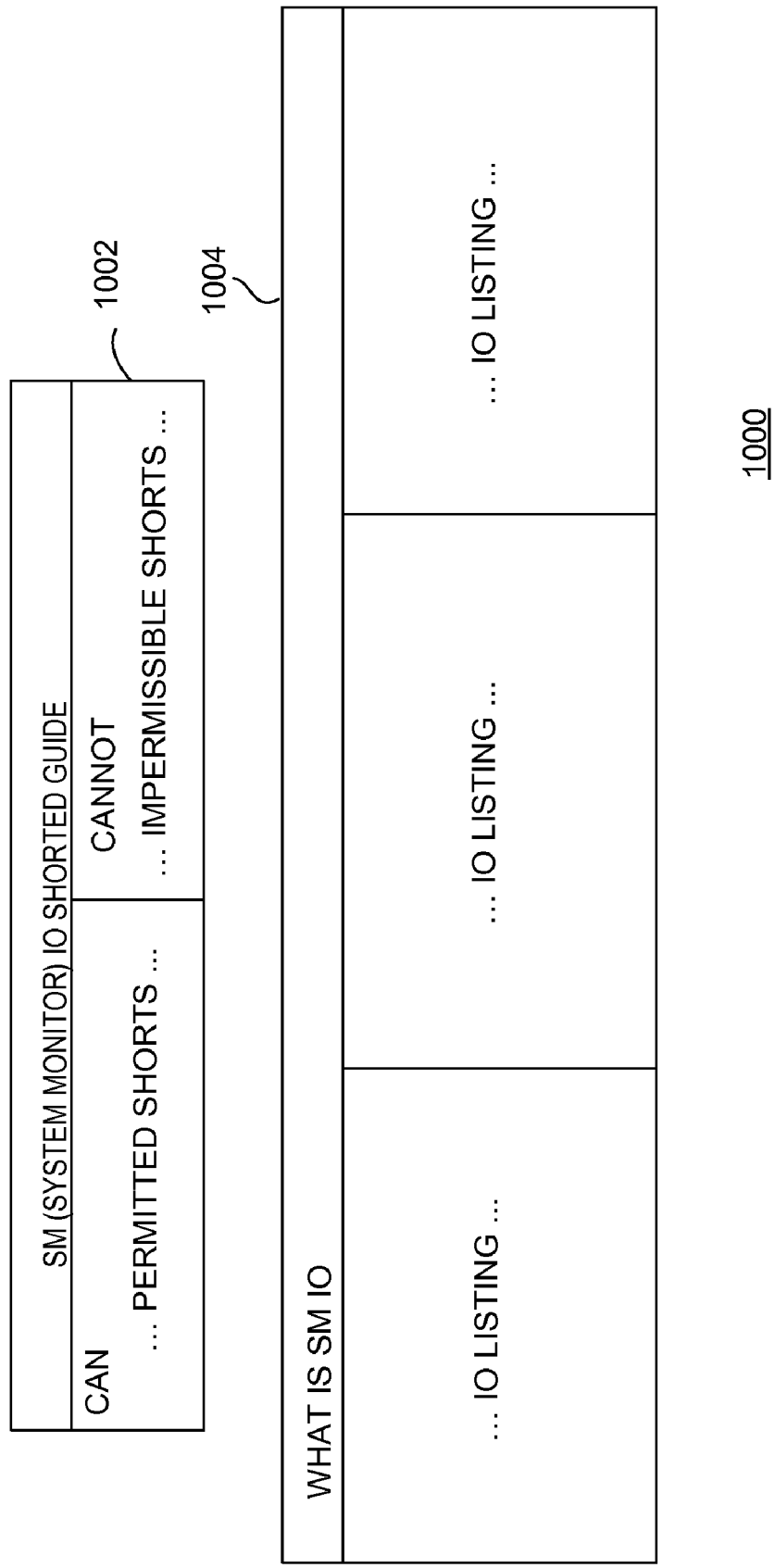
FIG. 10 shows an exemplary embodiment of a report for SM IOs rules and definitions.

FIG. 10 shows an exemplary embodiment of a report 1000 for SM IOs rules and definitions. The report 1000 includes a section 1002 that shows a guide to which types of pins an SM IO type can be shorted with and cannot be shorted with. The report 1000 also includes a section 1004 that shows a listing of particular SM IO pins on the selected IC. Those skilled in the art will appreciate that similar reports may be generated for the other pin types selectable in the rules/definition section 512.

Returning to FIG. 5, the SPG rule section 514 provides rules for collecting individual shorted pin pairs together into groups of pairs. FIG. 11 shows an exemplary embodiment of the SPG rule section 514. The SPG rule section 514 includes a plurality of buttons 1102 (e.g., 4 are shown). The buttons 1102 are associated with a respective plurality of pin type pairs. In the present example, selectable pin type pairs include general VREF SPG pair, general VRN/VRP SPG pair, general IO SPG pair, and MGT(GTP/GTX).

A user may interact with the SPG rule section 514 to perform a query against the pin shorting rules and the package files stored in the database. The criteria of the query include the type of pins selected. Using the criteria, the web server calls the source code to query the database to obtain information for the report showing rules for pairs of pin types. FIG. 12 shows an exemplary embodiment of a report 1200 for general VREF SPG pair rules. The report 1200 includes a list 1202 with rules for VREF SPG pairs. Those skilled in the art will appreciate that similar reports may be generated for other pin types selectable in the SPG rule section 514.

Returning to FIG. 5, the pin search section 516 is configured to show relevant information for a selected pin. FIG. 13 is an exemplary embodiment of the pin search section 516. The pin search section 516 includes radio buttons 1302, a text box 1304, and a button 1306. The radio buttons 1302 are selectable to identify the manner in which a pin will be labeled in the text box 1304. The button 1306, when activated, performs a query against the pin shorting rules and the package files stored in the database for a selected pin entered into the text box 1304. The criteria of the query include the family/device/package and the selected pin. Using the criteria, the web server calls the source code to query the database to obtain information related to the selected pin. Such information may include, for example, pin identifiers, whether the pin is dedicated or non-dedicated, pin position, whether the pin is bonded or unbonded for the given package, and the like.

Figure 14:
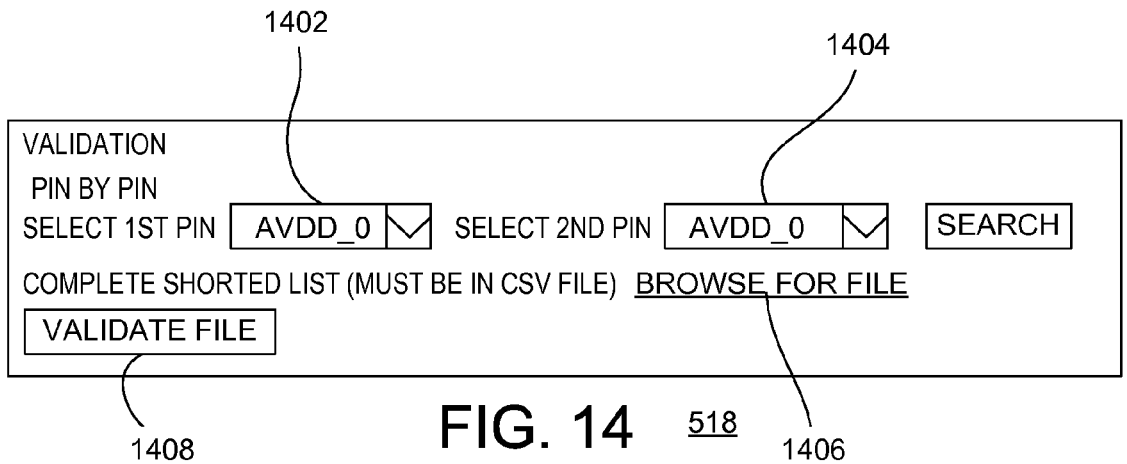
FIG. 14 is an exemplary embodiment of a shorted pair validation section of the web interface of FIG. 5.

Returning to FIG. 5, the validation section 518 is configured to show if a given pair of pins can be shorted together and can be further configured to validate a file containing a complete shorted pin plan for a given device/package. FIG. 14 is an exemplary embodiment of the shorted pair validation section 518. The shorted pair validation section includes drop-down boxes 1402 and 1404. The drop-down boxes 1402 and 1404 include a list of pins for the selected family/device/package. A user may interact with the shorted pair validation section 518 to perform a query against the pin shorting rules and the package files stored in the database for a specific pair of pins by use of the Search button. The criteria of the query include the family/device/package and the selected pins. Using the criteria, a query is generated that determines whether the pins can or cannot be shorted together. The user may use a Browse for file link 1406 to locate a file containing a complete shorted pin plan for a specific package/device combination that matches the device/package radio button selections in the user interface. Clicking a Validate File button 1408 causes the application to check all shorted pin assignments in the entire file and report back all cases of rule violations.

Figure 15:
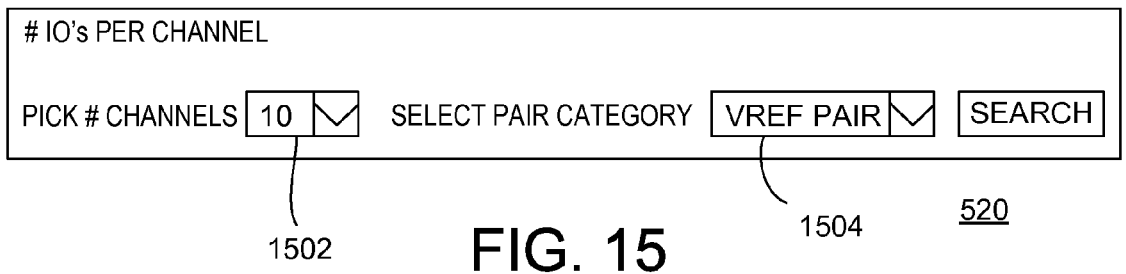
FIG. 15 is an exemplary embodiment of an IOs per channel section of the web interface of FIG. 5.

Returning to FIG. 5, the IOs per channel section 520 is configured to show the number of IOs of a given type for a selected number of tester channels. FIG. 15 is an exemplary embodiment of the IOs per channel section 520. The IOs per channel section 520 includes drop-down boxes 1502 and 1504. The drop-down box 1502 provides for a selection of a number of tester channels. The drop-down box 1504 provides a list of pin pair types for selection. A user may interact with the IOs per channel section 520 to perform a query against the pin shorting rules and the package files stored in the database. The criteria of the query include the family/device/package, a selected number of tester channels, and a selected pin pair type. Using the criteria, the web server calls the source code to query the database to determine the number of IOs of the selected pin pair type per tester channel.

Figure 16:
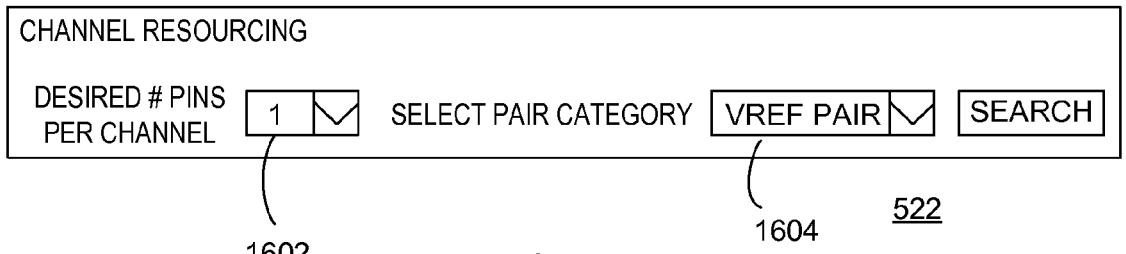
FIG. 16 is an exemplary embodiment of a channel resource section of the web interface of FIG. 5.

Returning to FIG. 5, the channel resource section 522 is configured to show how many tester channels are required given a desired number of pins of a particular type per channel. FIG. 16 is an exemplary embodiment of the channel resource section 522. The channel resource section 522 includes a drop down box 1602 and a drop-down box 1604. The drop-down box 1602 provides for a number of pins per channel. The drop-down box 1604 provides a list of pin pairs for selection. A user may interact with the channel resource section 522 to perform a query against the pin shorting rules and the package files stored in the database. The criteria of the query include the family/device/package, a selected number of pins per channel, and a selected pin pair type. Using the criteria, the web server calls the source code to query the database to determine the number of tester channels required.

Figure 17:
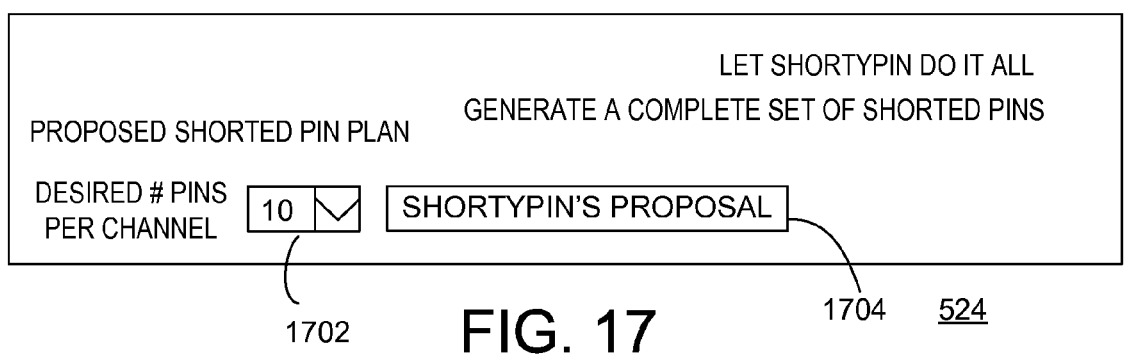
FIG. 17 is an exemplary embodiment of a proposed shorted pin plan section of the web interface of FIG. 5.

Returning to FIG. 5, the proposed shorted pin plan section 524 is configured to automatically create a shorted pin plan. FIG. 17 is an exemplary embodiment of the proposed shorted pin plan section 524. The proposed shorted pin plan section 524 includes a drop-down box 1702 and a button 1704. The drop-down box 1702 provides a number of pins per channel. The button 1704, when activated, causes generation of the shorted pin plan. The shorted pin plan may be generated as a file and/or shown on the display. A user may interact with the proposed shorted pin plan section 524 to perform a query against the pin shorting rules and the package files stored in the database. The criteria of the query include the family/device/package and a selected number of pins per channel. Using the criteria, the web server calls the source code to query database to determine a shorted pin plan. The shorted pin plan shows exactly which pins are shorted into tester channels for all pins bonded out for the selected package.

Figure 18:
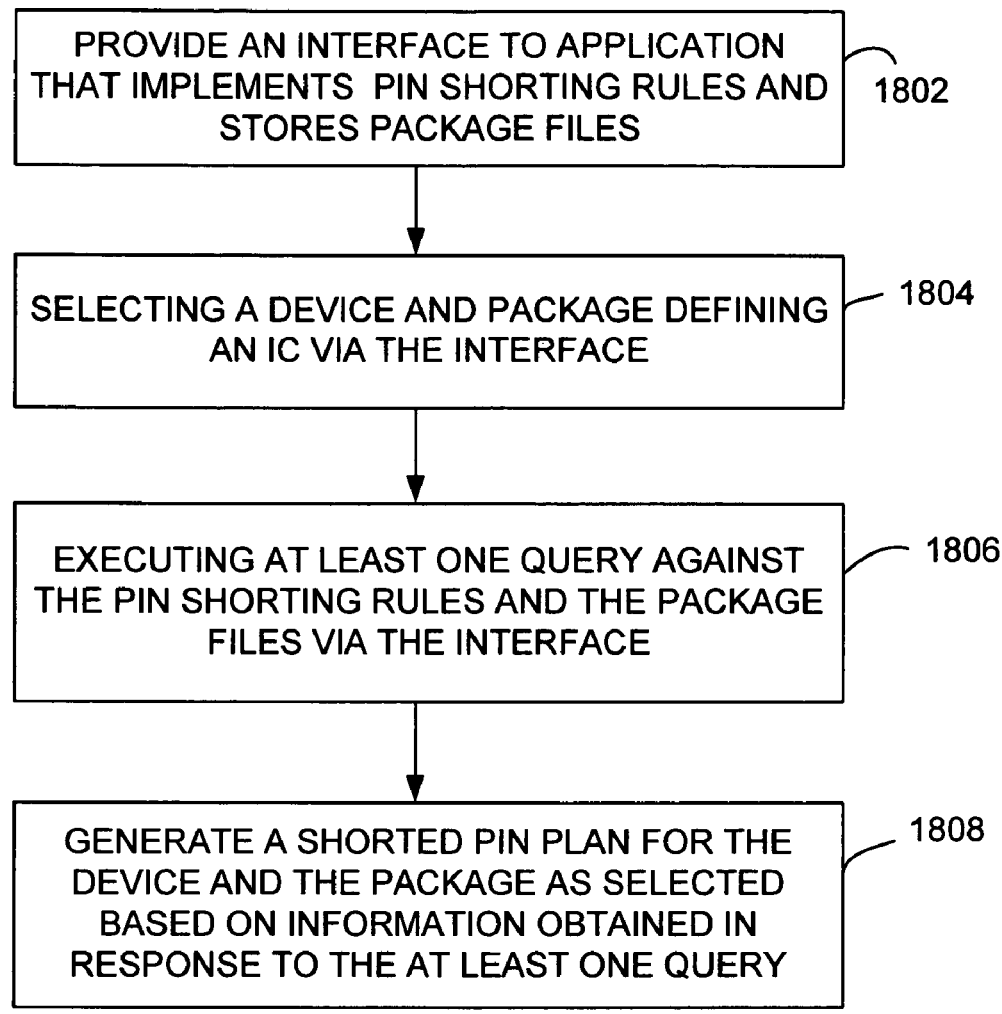
FIG. 18 is a flow diagram depicting an exemplary embodiment of a method for providing shorted pin information for constructing a DUT board in accordance with one or more aspects of the invention.

FIG. 18 is a flow diagram depicting an exemplary embodiment of a method 1800 for providing shorted pin information for constructing a DUT board in accordance with one or more aspects of the invention. The method 1800 may be performed using software, hardware, or a combination of software and hardware (e.g., using two or more computers, such as the computer 400 of FIG. 4). The method 1800 begins at step 1802, where an interface to an application implementing pin-shorting rules and storing package files is provided. The pin-shorting rules are associated generally with a plurality of ICs (e.g., a family of ICs). The package files are associated with specific ones of the ICs (e.g., specific family/device/package combinations). At step 1804, a device and package defining an IC is selected via the interface. At step 1806, at least one query is executed via the interface against the pin-shorting rules and the package files. At step 1808, a shorted pin plan is generated for the device and the package as selected based on information obtained in response to the at least one query. In one embodiment, the shorted pin plan is generated automatically in response to a query. For example, a user may interact with the shorted pin plan section 524 described above. Alternatively, a user may generate a shorted pin plan based on information obtained from one or more queries submitted through other sections of the interface 500 described above.

Method and apparatus for providing shorted pin information for constructing a DUT board for testing an IC is described. In one embodiment, an application is configured to implement pin shorting information and store package files for a plurality of ICs. The application provides a web interface to service queries from a user. A web server is provided to provide an interface to the application and to service queries from a user. The web interface provides a variety of reports and documentation that allow a user to generate a shorted pin plan for manufacture of a DUT board. The shorted pin plan is more reliable than word-of-mouth, informal guidelines, and ad-hoc emails, which are error prone and non-systematic. The web server/database/source code of the invention provide a systematic, single source of information for producing a shorted pin plan. The information is complete and accurate, greatly reducing the chance that the DUT board will be constructed incorrectly.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

What is claimed is:

1. A method of providing shorted pin information for constructing a device under test (DUT) board for integrated circuit testing, comprising:
   providing an interface to an application module that implements pin-shorting rules associated generally with a plurality of integrated circuits and stores package files associated with specific ones of the integrated circuits;
   selecting a device and a package defining one of the plurality of integrated circuits via the interface;
   executing, via the interface, at least one query against the pin-shorting rules and the package files stored in the database; and
   generating a shorted pin plan for the device and the package as selected based on information obtained in response to the at least one query.

2. The method of claim 1, wherein the plurality of integrated circuits include a plurality of pin types, and wherein the pin-shorting rules include first rules each dictating that one of the pin types can be shorted to another of the pin types and second rules each dictating that one of the pin types cannot be shorted to another of the pin types.

3. The method of claim 1, wherein the interface includes a report section for selecting reports associated with aspects of a package pinout for the device and the package as selected, and wherein the at least one query includes a query for generating one of the reports.

4. The method of claim 1, wherein the interface includes a rules definition section for selecting rules definitions associated with pin types for the device and the package as selected, and wherein the at least one query includes a query for displaying one of the rule definitions.

5. The method of claim 1, wherein the interface includes a shorted pin group section for selecting shorted pin group rules, and wherein the at least one query includes a query for displaying one of the shorted pin group rules.

6. The method of claim 1, wherein the interface includes a pin search section for displaying information associated with a pin or pin type of the device and the package as selected, and wherein the at least one query includes a name of a pin or pin type.

7. The method of claim 1, wherein the interface includes a validation section for selecting a pair of pins of the device and the package as selected to determine if the pair of pins can be shorted, and for evaluating a file with a complete shorted pin plan, and wherein the at least one query includes names of pins.

8. The method of claim 1, wherein the interface includes an IO per channel section for selecting a number of tester channels for pin types, and wherein the at least one query includes a value for the number of tester channels and a value for the pin type.

9. The method of claim 1, wherein the interface includes a channel resource section for selecting a number of pins per channel and a pin pair type, and wherein the at least one query includes a value for the number of pins per channel and a selected pin pair type.

10. The method of claim 1, wherein the interface includes a proposed shorted pin plan section for automatically generating the shorted pin plan in response to a selected number of pins per channel.

11. Apparatus for providing shorted pin information for constructing a device under test (DUT) board for integrated circuit testing, comprising:
   a source code module for implementing pin-shorting rules associated generally with a plurality of integrated circuits and for providing database queries; a database for storing package files associated with specific ones of the integrated circuits; and
   a server for providing an interface configured to select a device and a package defining one of the plurality of integrated circuits, call the source code to execute at least one query against the pin-shorting rules and the package files, and generate a shorted pin plan for the device and the package as selected based on information obtained in response to the at least one query.

12. The apparatus of claim 11, wherein the plurality of integrated circuits include a plurality of pin types, and wherein the pin-shorting rules include first rules each dictating that one of the pin types can be shorted to another of the pin types and second rules each dictating that one of the pin types cannot be shorted to another of the pin types.

13. The apparatus of claim 11, wherein the interface comprises a web interface.

14. The apparatus of claim 11, wherein the source code module, the database, and the server comprise modules of a network appliance.

15. A computer readable medium having stored thereon software for providing shorted pin information for constructing a device under test (DUT) board for integrated circuit testing, comprising:
   code for providing an interface to an application module that implements pin-shorting rules associated generally with a plurality of integrated circuits and stores package files associated with specific ones of the integrated circuits;
   code for selecting a device and a package defining one of the plurality of integrated circuits via the interface;
   code for executing, via the interface, at least one query against the pin-shorting rules and the package files stored in the database; and
   code for generating a shorted pin plan for the device and the package as selected based on information obtained in response to the at least one query.

16. The computer readable medium of claim 15, wherein the plurality of integrated circuits include a plurality of pin types, and wherein the pin-shorting rules include first rules each dictating that one of the pin types can be shorted to another of the pin types and second rules each dictating that one of the pin types cannot be shorted to another of the pin types.

17. The computer readable medium of claim 15, wherein the interface includes a report section for selecting reports associated with aspects of a package pinout for the device and the package as selected, and wherein the at least one query includes a query for generating one of the reports.

18. The computer readable medium of claim 15, wherein the interface includes a rules definition section for selecting rules definitions associated with pin types for the device and the package as selected, and wherein the at least one query includes a query for displaying one of the rule definitions.

19. The computer readable medium of claim 15, wherein the interface includes:
   a pin search section for displaying information associated with a pin or pin type of the device and the package as selected, and wherein the at least one query includes a name of a pin or pin type;
   a validation section for selecting a pair of pins of the device and the package as selected to determine if the pair of pins can be shorted, and for evaluating a file with a complete shorted pin plan, and wherein the at least one query includes names of pins;
   an IO per channel section for selecting a number of tester channels for pin types, and wherein the at least one query includes a value for the number of tester channels and a value for the pin type; and
   a channel resource section for selecting a number of pins per channel and a pin pair type, and wherein the at least one query includes a value for the number of pins per channel and a selected pin pair type.

20. The computer readable medium of claim 15, wherein the interface includes a proposed shorted pin plan section for automatically generating the shorted pin plan in response to a selected number of pins per channel.

* * * * *

UNITED STATES PATENT AND TRADEMARK OFFICE
CERTIFICATE OF CORRECTION

PATENT NO.       : 7,653,504 B1
APPLICATION NO.  : 11/651904
DATED            : January 26, 2010
INVENTOR(S)      : Simmons et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 180 days.

Signed and Sealed this

Twenty-third Day of November, 2010

David J. Kappos
*Director of the United States Patent and Trademark Office*